Oct. 27, 1936.    P. N. SMITH ET AL    2,059,050
RECORDING INSTRUMENT FOR MOTOR TRUCKS OR LIKE PURPOSES
Filed Jan. 13, 1933    2 Sheets-Sheet 1
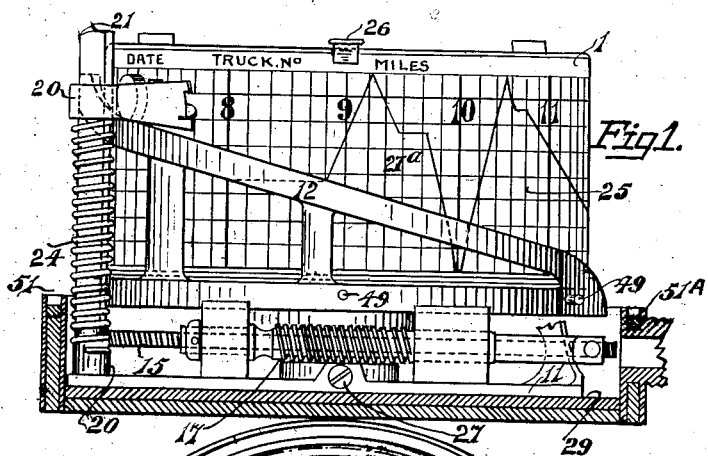
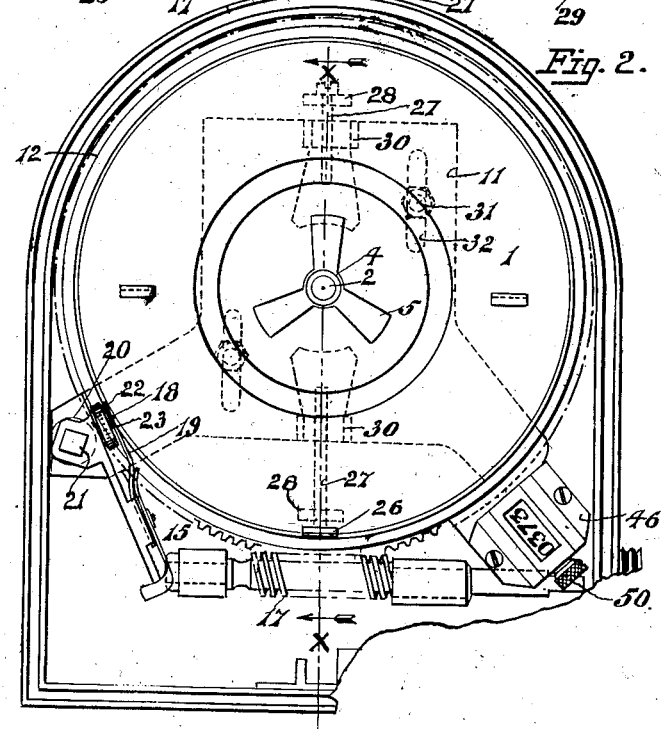
Inventors
Percy Nicholas Smith
Norman George Brown
BY
Attorneys

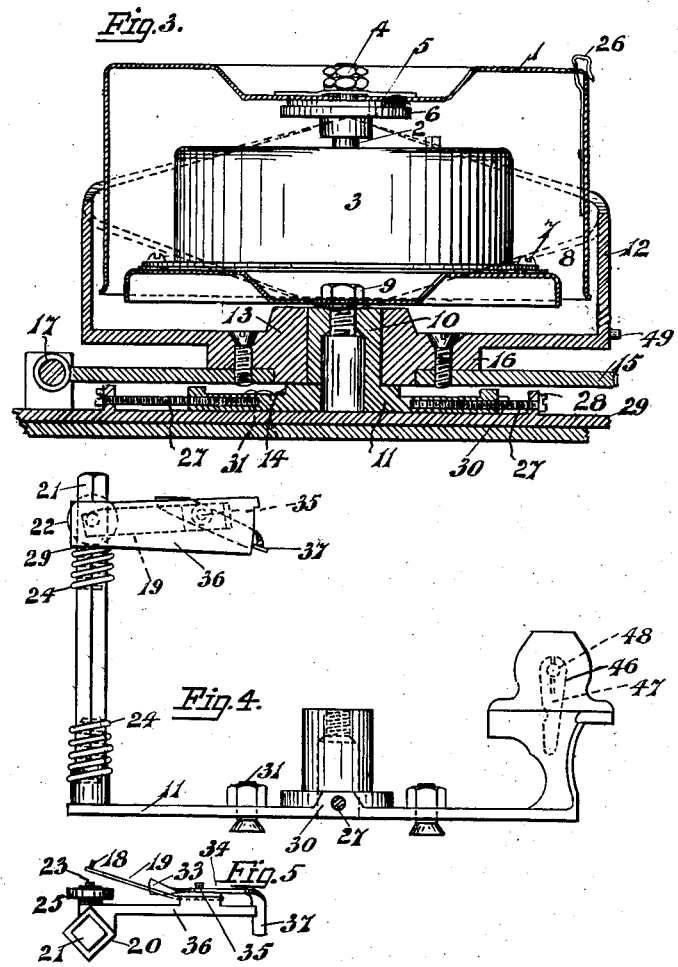

Patented Oct. 27, 1936

2,059,050

UNITED STATES PATENT OFFICE 2,059,050

RECORDING INSTRUMENT FOR MOTOR TRUCKS OR LIKE PURPOSES

Percy Nicholas Smith, East Camberwell, Victoria, and Norman George Brown, Kew, Victoria, Australia Application January 13, 1933, Serial No. 651,616
In Australia January 15, 1932

4 Claims. (Cl. 234—30)

Our invention relates to means for recording continuously on a graph, for a predetermined period, the operations of a motor truck, railway vehicle, machine or the like, and the objects of our invention are, firstly, to provide a simpler and more rugged construction than heretofore, and, secondly, to enable a less cumbersome length of graph strip to be used.

We attain these objects by the mechanism illustrated in the accompanying drawings, in which—

Figure 1 is an elevation of the instrument;

Figure 2 is a plan;

Figure 3 is a sectional elevation on the line X—X of Figure 2 looking in the direction of the arrows;

Figure 4 is an elevation of a slide plate and associated parts;

Figure 5 is a plan of the stylus and associated parts.

The invention is particularly described in relation to its use on a motor truck as its application to other purposes will be similar.

Instruments have been known for recording the times of use and the speed of a truck at various times together with the periods of rest. In one well-known instrument of that type a paper graph strip is used which provides a record over thirty-six hours but that has necessitated the use of a long strip of graph paper which is cumbersome to examine and in order to take up the length of material when in use on the instrument, the paper strip is unwound by clockwork from a spindle on to a drum.

The drum is rotated by this clockwork so that a horizontal distance on the graph indicates a definite period of time. A stylus is carried up and down on the graph strip by a train of levers one of which is moved upwards and downwards in relation to the chart strip by engagement of a pin, offset from the lever, with a cam groove on the outer face of a small rotating cylinder which is moved around by a worm drive actuated through gearing from the speedometer shaft of the vehicle or other suitable moving part. In actual use the drum, instead of rotating in a horizontal plane, may be positioned so that it rotates in a vertical or other plane, and the stylus will then move horizontally or otherwise at an angle to the direction of rotation of the drum; but for convenience of description the drum will be assumed to move horizontally. The vertical movement of the stylus in relation to the horizontal movement of the drum indicates the speed of the vehicle, or, in other words, the number of miles travelled in any particular time. If the vehicle is stationary the stylus remains stationary and the rotating drum causes a horizontal line to be marked on the chart. The length of the line indicates the time during which the vehicle remains stationary. The relative complexity of the train of levers and gearing, which actuates the stylus as above described, has rendered the instrument somewhat fragile in actual use on a motor truck or the like.

In our invention a drum 1 is secured to the spindle 2 of clockwork mechanism 3 by means of lock nuts 4 and a spring washer 5 which hold it against a plate 6 integral with the spindle. The clockwork mechanism is fastened by screws 7 to a plate 8 which in turn is secured by bolt 9 to a boss 10 integral with a slide plate 11. A cam sleeve 12 is provided with a hollow boss 13 adapted to accommodate the boss 10 and to rest against shoulders 14 thereon. A worm wheel 15 is attached to the base of the cam sleeve by screws 16 and engages a worm 17 connected to the speedometer shaft or other suitable moving part of the vehicle by a flexible or other connection. A stylus 18 is carried by a spring arm 19 connected as hereinafter described to a bracket 20 slidable on a shaft 21. A roller 22 mounted on a pin 23 offset from the bracket runs up or down the slope of the cam sleeve as the latter rotates. The spring 24 returns the bracket downwardly as the roller passes down the cam track.

An important feature of this invention resides in the direct operation of the stylus through a rotating cam sleeve surrounding the drum, thus avoiding the use of a train of levers and eliminating all parts which are likely to get out of order. Also the effects of vibration are reduced to a minimum owing to the use of a long cam track positioned closely adjacent to the surface of the chart and acting directly on the stylus-carrier without levers.

A graph strip 25 in the form of a collar is adapted to be slipped on to the drum and clipped into position by clips 26, the top of the drum being freely accessible from above for that purpose. As the drum is held between the spring washer 5 and plate 6 merely by a friction grip, the drum may be turned by hand so as to adjust the drum and attached graph collar to the time of day This graph collar or chart is provided with vertical lines corresponding to the hours of the working day and the space between adjacent hours is divided by other vertical lines, which are preferably six in number so that the spaces between them each correspond to ten minutes.

The drum slowly rotates so that in ten minutes in the example given, it would rotate through a peripheral distance equivalent to the length of the base of one of the small squares 27ᵃ. If the speedometer shaft or other movable part was stationary at any particular time, the stylus would cause a horizontal line to be marked upon the chart but if the speedometer shaft or the like is moving the cam sleeve rotates with greater or less speed according to the speed of the speedometer shaft, consequently the stylus is moved upward if the rising portion of the cam sleeve is passing under the roller of the stylus. If the speed of the vehicle was very fast indeed the stylus would be moved upwards so rapidly under the rapid movement of the cam sleeve that it would leave an almost vertical line upon the chart. When the cam sleeve has lifted the stylus to the top of the chart the descending portion of the cam track begins to pass under the roller and the stylus begins to mark downwardly upon the chart. Thus the graph passes upwards from the bottom to the top of the chart, then downwards to the bottom of the chart and then upwards again, and so on. The chart is divided by eight horizontal lines, for example, so that the vertical sides of each of the small squares may be made to represent quarter miles. Consequently, if a line of the graph in running from the bottom to the top of the chart or vice versa passed laterally through a distance corresponding to the base of one of the small squares it would mean that the vehicle had covered two miles in ten minutes. The sizes of the divisions and their value may, of course, be altered as desired. With different makes of vehicles it is necessary to adjust the gear ratio of the worm to the worm wheel and this is done by unscrewing the worm wheel from the base of the cam sleeve and replacing it by a larger or smaller worm wheel. The position of the worm wheel in relation to the worm is adjusted by moving the slide plate 11 which carries the instrument. This slide plate is adjustable by set screws 27 (Fig. 3) passing through apertures in lugs 28 upstanding from base plate 29 and engaging threaded bores in lugs 30 of the slide plate. When the worm wheel has been brought into accurate engagement with the worm the slide plate may be clamped in position by bolts 31 (Figs. 2, 3 and 4) passing through slots 32 (Fig. 2) and held by suitable nuts. If the marking of the graph on Figure 1 is followed it will be seen that from eight o'clock to about 8.51 the portion of the graph indicated by a dotted line is horizontal. That means that the vehicle or machine in question was stationary. Assuming that the graph refers to a motor lorry it will be noticed that it then travelled about one and one-eighth miles taking about twenty-two minutes to do so. The inclination of the lines is exaggerated in this drawing for convenience of illustration and consequently the recorded speed of the vehicle is much lower than would be normally the case in practice. From 9.13 to 9.26 the vehicle travelled about five-eighths of a mile. The vehicle was then stationary until 9.42 and then travelled at a uniform rate until about 9.57 covering a mile and a quarter in that period. It then remained stationary for a short period, which might represent a traffic stop (somewhat exaggerated in length in the drawings). It next travelled one and three quarter miles, represented by the distance from the bottom to the top of the graph, in about twenty-four minutes, and continued at about that speed until (see downward line) about 10.32 when it was held up for a minute or two, presumably by a traffic stop. The vehicle then travelled at uniform speed until about 11.50. It will thus be seen that, while the chart is only about fifteen inches long and two and a half inches wide, the graph indicates quite clearly the complete history of the operations of a motor truck or other vehicle or machine during a working day. Should the chart be left on for longer than a working day it would still be readable, as any extension of the graph such as the next day's graph, for example, would not coincide with the graph already marked on the chart. The spring arm which carries the stylus may be forced away from the chart by a cam face 33 on a lever 34 pivoted at 35 to an arm 36 of the bracket and operated by a handle 37.

On the lower outer periphery of the cam sleeve a series of offset striker arms such as studs 49 (Figs. 1 and 3) is provided. Each of these studs is adapted to engage in turn a trip arm 47 (Fig. 4) and thus actuate a shaft 48 of a counter unit 46 (Figs. 2 and 4). The latter is provided with a handle 50 (Fig. 2) by which it may be re-set from time to time, as is customary.

The instrument is provided with a slot 51 (Fig. 1) fitted with a rubber gasket 51A in order to engage the edge of any suitable cover which may be secured in position by any suitable lock to prevent interference of any kind and to exclude water and dust.

We claim:—

1. In a recording device, a drum having a cylindrical record bearing surface, means for rotating the drum, a stylus, means for supporting the stylus in operative relation with the drum for movement transversely of the record-bearing surface, means for moving the stylus comprising a sleeve concentric with the drum and provided with a cam edge formed on one end and extending peripherally about the record bearing surface of the drum and directly adjacent thereto, means on the stylus support engaging the cam edge for causing the stylus to move transversely over the record-bearing surface, and means for rotating the sleeve.

2. In a recording device, a drum having a cylindrical record bearing surface, means for rotating the drum, a stylus, means for supporting the stylus in operative relation with the record bearing surface of the drum for movement transversely of said surface, means for moving the stylus transversely of the surface and comprising a sleeve having one end provided with a cam edge disposed concentrically with the drum and rotated independently of the drum, said cam edge being directly adjacent the record bearing surface, a means carried by the stylus support and engaging the cam edge for causing the stylus to move transversely of the movement of the drum, and means for causing the support to retain the means carried by the support in engagement with the cam edge.

3. In a recording device, a rotatable drum having a record bearing surface, a concentrically mounted sleeve provided with a cam edge, a stylus adapted to be moved transversely of said surface by the cam edge, a slidably mounted plate, means for supporting the stylus on said plate, a gear secured to the sleeve and rotatably mounted on said plate, means for rotating said gear, means for moving the plate for placing the gear into operative relation with said rotating means, said drum, gear and sleeve being mounted as a unit on the plate.

4. In a recording device, a drum having a cylindrical record-bearing surface, means for rotating the drum, a stylus, means for supporting the stylus in operative relation with the drum for movement transversely of the record-bearing surface, means for moving the stylus comprising a sleeve concentric with the drum and provided with a cam edge formed on one end and extending peripherally above the record-bearing surface of the drum and directly adjacent thereto, means on the stylus support engaging the cam edge for causing the stylus to move transversely over the record-bearing surface, the contour of said cam edge being a uniform slope throughout its length, such that one cam cycle represents a certain distance, the said record-bearing surface having a scale on which the maximum displacement of the stylus, due to the cam edge, represents a distance having a fixed relation to the distance aforesaid, and means for rotating the sleeve.

PERCY NICHOLAS SMITH.
NORMAN GEORGE BROWN.